United States Patent

Lim et al.

(10) Patent No.: US 10,176,245 B2
(45) Date of Patent: Jan. 8, 2019

(54) SEMANTIC QUERY BY EXAMPLE

(75) Inventors: Lipyeow Lim, Hawthorne, NY (US); Haixun Wang, Irvington, NY (US); Min Wang, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1190 days.

(21) Appl. No.: 12/566,882

(22) Filed: Sep. 25, 2009

(65) Prior Publication Data

US 2011/0078187 A1 Mar. 31, 2011

(51) Int. Cl.
*G06F 17/00* (2006.01)
*G06F 17/30* (2006.01)

(52) U.S. Cl.
CPC .. *G06F 17/30598* (2013.01); *G06F 17/30404* (2013.01); *G06F 17/30672* (2013.01); *G06F 17/30734* (2013.01)

(58) Field of Classification Search
CPC .............. G06F 17/30672; G06F 17/30734
USPC ................................. 707/713, 736
See application file for complete search history.

(56) References Cited

U.S. PATENT DOCUMENTS

| | | | |
|---|---|---|---|
| 6,675,159 B1 * | 1/2004 | Lin | G06F 17/2705 |
| 7,480,667 B2 * | 1/2009 | Harr | G06F 17/30663 |
| 7,529,732 B2 | 5/2009 | Liu | |
| 7,529,737 B2 * | 5/2009 | Aphinyanaphongs | G06F 17/30705 |
| 7,533,089 B2 * | 5/2009 | Pan | G06F 17/2785 |
| 7,542,958 B1 * | 6/2009 | Warren | G06F 17/3089 706/48 |
| 7,725,414 B2 * | 5/2010 | Nigam | G06F 17/30705 706/45 |
| 7,725,493 B2 * | 5/2010 | Saund | G06F 17/30961 707/713 |
| 7,937,345 B2 * | 5/2011 | Schmidtler | G06N 99/005 706/15 |
| 8,108,381 B2 * | 1/2012 | Eberholst | G06F 17/3069 707/713 |

(Continued)

OTHER PUBLICATIONS

A K Choupo, L. Berti-Equille, and A. Morin. Optimizing progressive query-by-example over pre-clustered large image databases. In V. Benzaken, editor, BDA, 2005, pp. 13-20.

(Continued)

*Primary Examiner* — Eliyah S. Harper
(74) *Attorney, Agent, or Firm* — Cantor Colburn LLP; Rahan Uddin

(57) ABSTRACT

A computer-implemented method, system, and computer program product for producing a semantic query by example are provided. The method includes receiving examples of potential results from querying a database table with an associated ontology, and extracting features from the database table and the examples based on the associated ontology. The method further includes training a classifier based on the examples and the extracted features, and applying the classifier to the database table to obtain a semantic query result. The method also includes outputting the semantic query result to a user interface, and requesting user feedback of satisfaction with the semantic query result. The method additionally includes updating the classifier and the semantic query result iteratively in response to the user feedback.

19 Claims, 6 Drawing Sheets

(56) References Cited

U.S. PATENT DOCUMENTS

| | | | |
|---|---|---|---|
| 8,793,249 B2* | 7/2014 | Lai | G06F 17/30867 706/20 |
| 2005/0055365 A1* | 3/2005 | Ramakrishnan | G06F 17/30651 |
| 2007/0130112 A1* | 6/2007 | Lin | G06F 17/3002 |
| 2007/0288432 A1* | 12/2007 | Weltman et al. | 707/3 |
| 2008/0086433 A1* | 4/2008 | Schmidtler | G06N 99/005 706/12 |
| 2009/0010275 A1* | 1/2009 | Diepstraten | H04W 28/26 370/445 |
| 2009/0254519 A1* | 10/2009 | Ma | G06F 17/30259 |

OTHER PUBLICATIONS

G. Boccignone, et al., Animate System for Query by Example in Image Databases, in EuroIMSA, 2005, pp. 451-456.

ASTM E2369 05 Standard Specification for Continuity of Care Record (CCR), retrieved from the internet on Aug. 5, 2009: http://www.astm.org, 2 pages.

Christoph Kiefer, Abraham Bernstein, Markus Stocker, The Fundamentals of iSPARQL—A Virtual Triple Approach for Similarity-Based Semantic Web Tasks, Proceedings of the 6th International Semantic Web Conference (ISWC), Mar. 2007, Springer, 15 pages.

D. Zhou, J. Huang, and B. Scholkopf. Learning from labeled and unlabeled data on a directed graph. In Int'l Conf. on Machine Learning (ICML), pp. 1036-1043. ACM, 2005.

G. Schohn and D. Cohn. Less is more: Active learning with support vector machines. In Int'l Conf. on Machine Learning (ICML), pp. 839-846. Morgan Kaufmann, 2000.

Gultekin Ozsoyoglu, Huaqing Wang, "Example-Based Graphical Database Query Languages," Computer, vol. 26, No. 5, pp. 25-38, May 1993.

H. Kashima and Y. Tsuboi. Kernel-based discriminative learning algorithms for labeling sequences, trees, and graphs. In Int'l Conf. on Machine Learning (ICML), p. 58. ACM, 2004.

H Kashima, K. Tsuda, and A Inokuchi. Marginalized kernels between labeled graphs. In Int'l Conf. on Machine Learning (ICML), 2003.

H S Seung, M. Opper, and H Sompolinsky. Query by committee. In Computational Learning Theory, pp. 287-294, 1992.

Health level seven, retrieved from the internet on Aug. 5, 2009: http://www.hl7.org, 2 pages.

International Classification of Diseases, Ninth Revision,Clinical Modification (ICD-9-CM), retrieved from the internet on Aug. 5, 2009: http://www.cdc.gov/nchs/about/otheract/icd9/abticd9.htm, 2 pages.

L. Lim, H. H Wang, and M. Wang. Semantic data management: Towards querying data with their meaning. In Int. Conf. Data Engineering (IODE), pp. 1438-1442, 2007.

L. Lim, H. Wang, and M. Wang. Unifying data and domain knowledge using virtual views. In Proc. of Very Large Database (VLDB), pp. 255-266, 2007.

L. Ma, Z. Su, Y. Pan, L. Zhang, and T. Liu. RStar: An RDF storage and query system for enterprise resource management. In Int'l Conf. on Information and Knowledge Management (CIKM), 2004.

M. Belkhatir, P. Mulhem, and Y. Chiaramella. A conceptual image retrieval architecture combining keyword-based querying with transparent and penetrable query-by-example. In ACM International Conference on Image and Video Retrieval (CIVR), pp. 528-539, 2005.

M. M. Zloof. Query-by-example: the invocation and definition of tables and forms. In D. S. Kerr, editor, Proc. Of Very Large Database (VLDB), pp. 1-24. ACM, 1975.

M. M. Zloof. Query-by-example: A data base language. IBM Systems Journal, 16(4): 324-343, 1977.

N. Rasiwasia, N. Vasconcelos, and P. J. Moreno. Query by semantic example. In ACM International Conference on Image and Video Retrieval (CIVR), pp. 51-60, 2006.

National cancer institute thesaurus, retrieved from the internet Aug. 5, 2009: http://www.nci.nih.gov/cancerinfo/terminologyresources,1 page.

OTK tool repository, retrieved from the internet on Aug. 5, 2009: Ontoedit. http://www.ontoknowledge.org/tools/ontoedit.shtml, 2 pages.

R. Gilad-Bachrach, A. Navot, and N. Tishby. Query by committee made real. In the Neural Information Processing Systems (NIPS), 2005.

R. Krishnamurthy, S. P. Morgan, and M. M. Zloof. Query-by-example: Operations on piecewise continuous data (extended abstract). In Proc. of Very Large Database (VLDB), pp. 305-308, 1983.

RDF Query by Example, retrieved from Internet on Jul. 31, 2009: http://www.csd.abdn.ac.uk/research/AgentCities/QueryByExample/, 4 pages.

S. Das, E. I. Chong, G. Eadon, and J. Srinivasan. Supporting ontology-based semantic matching in RDBMS. In Proc. of Very Large Database (VLDB), pp. 1054-1065, 2004.

S. Tong and D. Koller. Support vector machine active learning with applications to text classification. In P. Langley, editor, Int'l Cont. on Machine Learning (ICML), pp. 999-1006. Morgan Kaufmann, 2000.

Suzanne Little, et al., Rules-By-Example: A Novel Approach to Semantic Indexing and Querying of Images, Third International Semantic Web Conference, ISWC2004, 17 pages.

SWAD—Europe Deliverable 10.2, Mapping Semantic WebData with RDBMSes, retrieved from the Internet on Aug. 7, 2009: http://www.w3.org/2001/sw/Europe/reports/scalable rdbms mapping report/, 24 pages.

Systematized Nomenclature of Medicine-Clinical Terms, retrieved from the internet on Aug. 5, 2009: http://www.ihtsdo.org/, 2 pages.

T. Joachims, SVM-Light support vector machine, retrieved from the internet on Aug. 5, 2009: http://svmlight.joachims.org/, 12 pages.

The Karlsruhe Ontology and semantic web tool suite, retrieved from the internet on Aug. 5, 2009: http://kaon.semanticweb.org/, 1 page.

The protg ontology editor and knowledge acquisition system, retrieved from the internet on Aug. 5, 2009: http://protege.stanford.edu/, 1 page.

Ontobroker, retrieved from the Internet on Aug. 5, 2009: http://ontobroker.semanticweb.org/, 1 page.

\* cited by examiner

SEMANTIC QUERY BY EXAMPLE

BACKGROUND

The present invention relates generally to computer database queries, and more specifically, to producing semantic queries by example for extracting information from a computer database and an associated ontology.

A relational database organizes information using a relational model or schema to group data with common attributes into data sets. For example, a table of high-level student information may link to a table of addresses using identifier fields as keys to establish relationships between rows or tuples in each table. Thus, if multiple students share a common address, the common address need not be repeated multiple times in the table of high-level student information; rather, primary and foreign keys linking the tables can convey a many-to-one relationship between the multiple students and the common address.

An ontology is a formal representation of a set of concepts within a domain and the relationships between the concepts that may be used to reason about domain properties. An ontology associated with the information organized in a relational database is typically more complex than the structure of the relational database, as the ontology represents a graph structured model of knowledge that may be captured within the relational database.

A semantic query attempts to assist a user in obtaining or manipulating data within a database without requiring user knowledge of data organization. Incorporating the knowledge of a related ontology into defining the semantic query can enhance search results. For instance, a query of patient data in medical records for a precise diagnosis may yield only a handful of results, but if the query is extended to include synonyms and related terminology as defined in the related ontology, a richer and more meaningful data set can be returned.

SUMMARY

An exemplary embodiment is a computer-implemented method for producing a semantic query by example. The method includes receiving examples of potential results from querying a database table with an associated ontology, and extracting features from the database table and the examples based on the associated ontology. The method further includes training a classifier based on the examples and the extracted features, and applying the classifier to the database table to obtain a semantic query result. The method also includes outputting the semantic query result to a user interface, and requesting user feedback of satisfaction with the semantic query result. The method additionally includes updating the classifier and the semantic query result iteratively in response to the user feedback.

Another exemplary embodiment is a system for producing a semantic query by example. The system includes semantic query by example logic configured to execute on a processing unit and output to a user interface. The semantic query by example logic is configured to receive examples of potential results from querying a database table with an associated ontology. The semantic query by example logic is further configured to extract features from the database table and the examples based on the associated ontology, and train a classifier based on the examples and the extracted features. The semantic query by example logic is also configured to apply the classifier to the database table to obtain a semantic query result, output the semantic query result to the user interface, and request user feedback of satisfaction with the semantic query result. The semantic query by example logic is additionally configured to update the classifier and the semantic query result iteratively in response to the user feedback.

A further exemplary embodiment is a computer program product for producing a semantic query by example. The computer program product includes a storage medium readable by a processing circuit and storing instructions for execution by the processing circuit for implementing a method. The method includes receiving examples of potential results from querying a database table with an associated ontology, and extracting features from the database table and the examples based on the associated ontology. The method further includes training a classifier based on the examples and the extracted features, and applying the classifier to the database table to obtain a semantic query result. The method also includes outputting the semantic query result to a user interface, and requesting user feedback of satisfaction with the semantic query result. The method additionally includes updating the classifier and the semantic query result iteratively in response to the user feedback.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention generate semantic query results by example using machine learning. Expressing queries against a database table and a related graph structured ontology using structured query language (SQL) can be difficult due to vastly different organizational structures between a relational database and an associated ontology. Where data and its related ontology are complicated, user-generated queries may be imprecise, as users often have only a vague notion, rather than a clear understanding and definition of the data sought by the queries. In exemplary embodiments, semantic query results for relational databases are generated by user examples. Instead of endeavoring to incorporate a graph structured ontology into a relational form and creating new language constructs to express such queries, a user provides a small set of examples that may satisfy a desired query. Using the set of examples as seeds, a semantic query system infers the details of the desired query automatically, and the user is therefore shielded from the complexity of interfacing with the ontology. Initially, the user provides the semantic query system with several examples that may satisfy the desired query. The semantic query system uses machine-learning techniques to mine query semantics of the desired query from the given examples and one or more related ontologies. The query semantics can then be applied on the data to generate full semantic query results. Active learning logic can also be used in the process to quickly find accurate query semantics.

Figure 1:
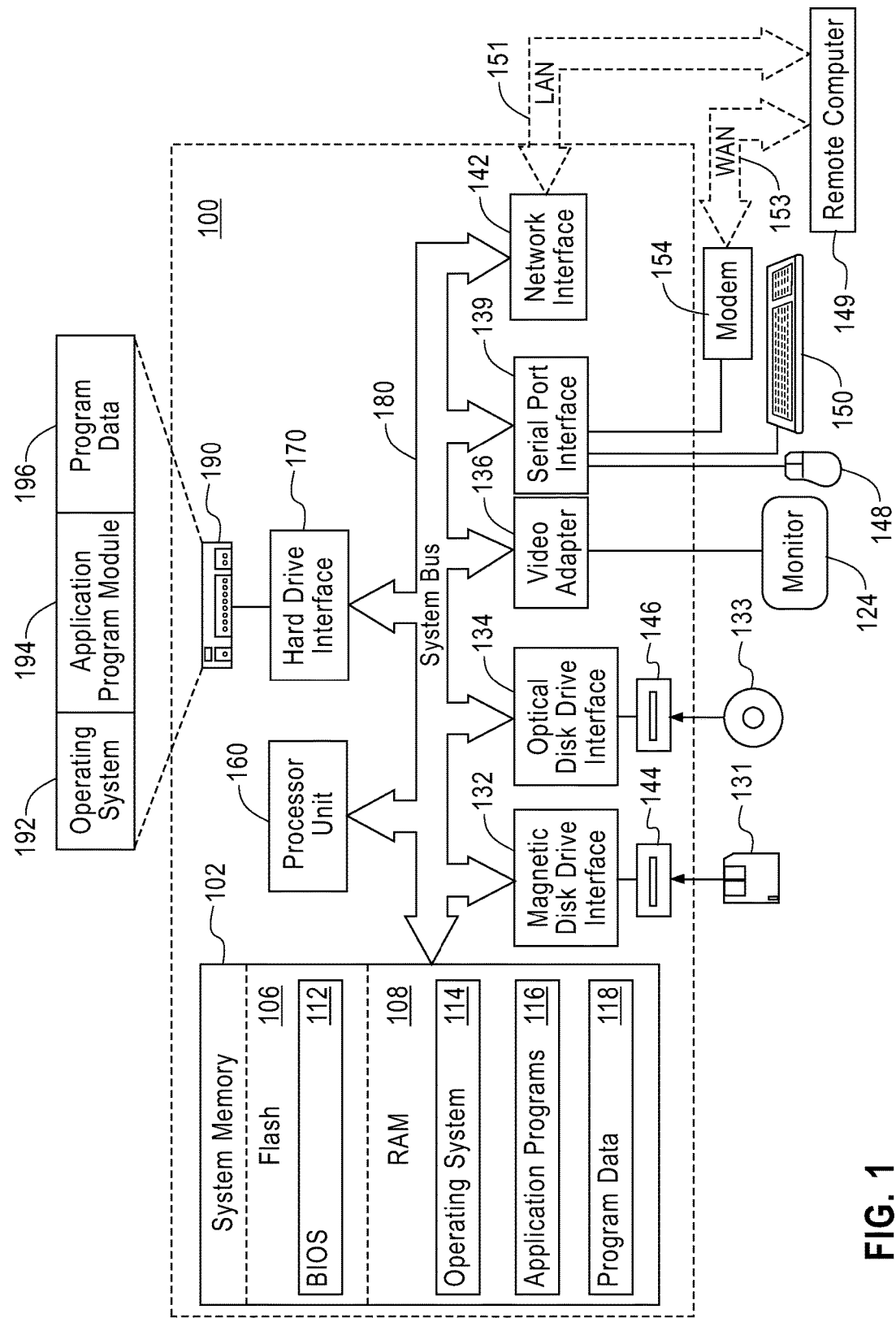
FIG. 1 depicts a block diagram illustrating an exemplary computer processing system that may be utilized to implement exemplary embodiments of the present invention.

Turning now to the drawings, it will be seen that in FIG. 1 there is a block diagram of a processing system 100 upon which a semantic query system can be implemented in exemplary embodiments. For discussion purposes, the processing system 100 is described as having features common to a personal computer, such as a desktop or portable computer. As used herein, however, the terms "processing system," "computer," and the like are intended to mean essentially any type of computing device or machine that is capable of receiving, storing, and running a software product, including such devices as communication devices and personal and home consumer devices supporting semantic query result creation using semantics learned from examples that satisfy the semantic query.

Processing system 100, as provided in FIG. 1, is configured as a personal computer that generally includes a processing unit 160 (or processing circuit), a system memory 102, and a system bus 180 that couples system memory 102 to processing unit 160. The system memory 102 includes non-volatile memory 106 and random access memory (RAM) 108. Non-volatile memory 106 is an electrically erasable programmable read only memory (EEPROM) module that includes a basic input/output system (BIOS) 112, which may be implemented in flash memory. BIOS 112 contains the basic routines that facilitate transfer of information between elements within processing system 100, such as during start-up.

Processing system 100 further includes a hard disk drive 190, a magnetic disk drive 144 (which can be used to read from or write to a removable disk 131), and an optical disk drive 146 (which can be used to read a CD-ROM disk 133 or read or write to other optical media). Hard disk drive 190, magnetic disk drive 144, and optical disk drive 136 are electrically communicatively coupled to system bus 180 by a hard disk drive interface 170, a magnetic disk drive interface 132, and an optical drive interface 134, respectively. The drives and their associated computer-readable media provide nonvolatile storage for processing system 100. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments. Likewise, one or more of the hard disk drive 190, magnetic disk drive 144, and optical disk drive 146 can be omitted within the scope of the invention.

A number of program modules may be stored in the drives and RAM 108, including an operating system 114, application program modules 116 (such as, for example, development applications), and program data 118. A user may enter commands and information into processing system 100 through a keyboard 150 and/or a mouse 148. Other input devices (not shown) may include, for example, a microphone, joystick, game pad, satellite dish, scanner, or the like. These and other input devices are often connected to processing unit 160 through a serial port interface 139 that is coupled to system bus 180, but may be connected by other interfaces, such as a game port or a universal serial bus (USB). A monitor 124 or other type of display device is also connected to system bus 180 via an interface, such as a video adapter 136. In addition to the monitor, the exemplary computer operating environment may also include other peripheral output devices (not shown), such as speakers or printers.

Processing system 100 may operate in a networked environment using logical connections to one or more remote computers, such as a remote computer 149. Remote computer 149 may be, for example, a server, a router, a peer device, or another common network node, and may include many or all of the elements described in relation to processing system 100. The logical connections depicted in FIG. 1 include a local area network (LAN) 151 and a wide area network (WAN) 153.

When used in a LAN networking environment, processing system 100 is connected to LAN 151 through a network interface 142. When used in a WAN networking environment, processing system 100 includes a modem 154 or other means for establishing communications over WAN 153, such as the Internet. Modem 154, which may be internal or external to processing system 100, is connected to system bus 180 via serial port interface 139. In a networked environment, program modules depicted relative to processing system 100, or portions thereof, may be stored in the remote memory storage device. It will be appreciated that the network connections shown are exemplary and other means of establishing a communications link between the computers may be used.

Figure 2:
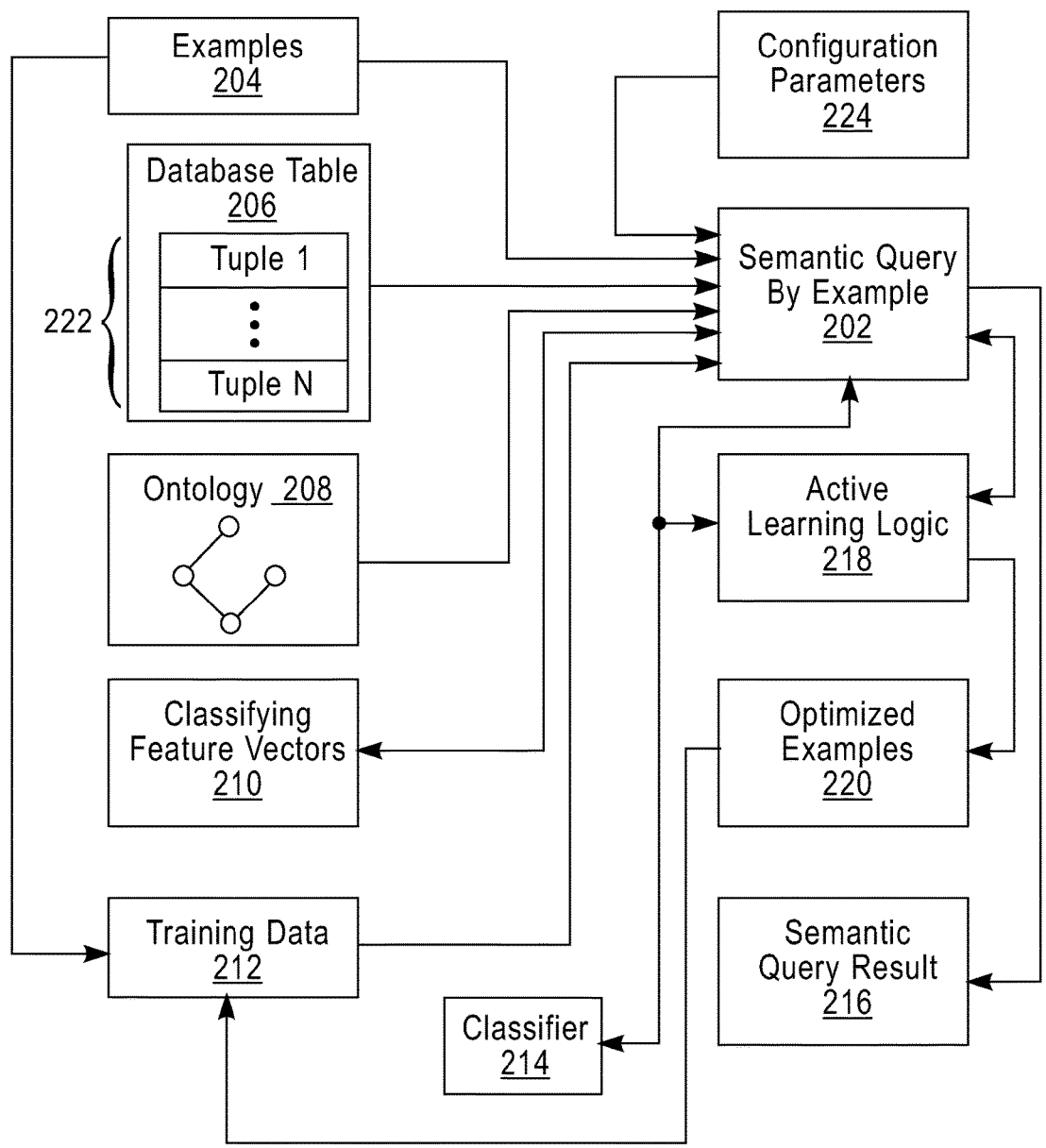
FIG. 2 depicts an example of a semantic query system in accordance with exemplary embodiments.

FIG. 2 depicts an example of a semantic query system 200 in accordance with exemplary embodiments, which may be implemented on the processing system 100 of FIG. 1. In exemplary embodiments, the semantic query system 200 includes semantic query by example (SQBE) logic 202 that accesses examples 204, database table 206, and ontology 208 to generate classifying feature vectors 210, training data 212, classifier 214, and semantic query results 216. The SQBE logic 202 can produce and iteratively update the classifier 214 as a model to hold rules for generating the semantic query results 216 using machine learning. The SQBE logic 202 may also interface with active learning logic 218 to further refine the classifier 214 and to generate optimized examples 220. The optimized examples 220 can be presented to a user of the semantic query system 200 to solicit user feedback for providing more directed values in updating the training data 212 and to improve the accuracy of the classifier 214. When implemented on the processing system 100 of FIG. 1, the user can view the monitor 124 and use one or more of the keyboard 150 and/or mouse 148 to input the examples 204 and provide user feedback. The processor unit 160 of FIG. 1 can execute instructions to implement the functions of the SQBE logic 202 and the active learning logic 218.

The SQBE logic 202 can support two phases of operation, an off-line phase and an online phase. In the off-line phase, the database table 206 is scanned to compute a feature vector associated with an ontology identifier (OID) in each record of tuples 222. In the on-line phase, a user poses a query on the database table 206 by selecting or providing the examples 204 that may satisfy a desired query. The examples 204 can be formatted as a user-generated list of examples of known related words, for instance, "brain tumor" and "intraventricular neoplasm". Alternatively, the SQBE logic 202 can provide a subset of tuples 222 from which the user can select the examples 204. When the user is presented the tuples 222 or records within the tuples 222, the user can mark positive and/or negative examples as the examples 204 to indicate tuples that satisfy and/or do not satisfy the desired query. In the on-line phase, the SQBE logic 202 uses machine learning to train the classifier 214 from the examples 204. Once the classifier 214 is established, the database table 206 is scanned again, and the SQBE logic 202 uses the classifier 214 to decide which of the tuples 222 (or records within the tuples 222) satisfy the desired query, producing the semantic query results 216.

The examples 204 are used in populating the training data 212. Since the examples 204 may be user-provided, there is a risk that the resulting training data 212 may be of small size and/or low quality, which can incur a negative impact on the accuracy of the classifier 214. In such a case, the user can be probed systematically to determine whether predictions made by the SQBE logic 202 are accurate for an additional small number of optimized examples 220 selected by the active learning logic 218.

To develop the classifier 214 that represents a semantic query, base data in the database table 206 is expanded to include related information in the ontology 208. The expanded data can be added to the database table 206 or written into a separate data structure, such as the classifying feature vectors 210. For ease of discussion, the addition of expansion data will be described in reference to the classifying feature vectors 210. The SQBE logic 202 can use a variety of approaches to capture enough information from the ontology 208 related to records in the database table 206 to develop the classifier 214 for a semantic query. The ontology 208 includes a graph or hierarchical structure of nodes holding concept information. Vectorizing the ontology 208 can reduce the structure and information down to a set of unique concepts and distances between nodes of the ontology 208.

Figure 3:
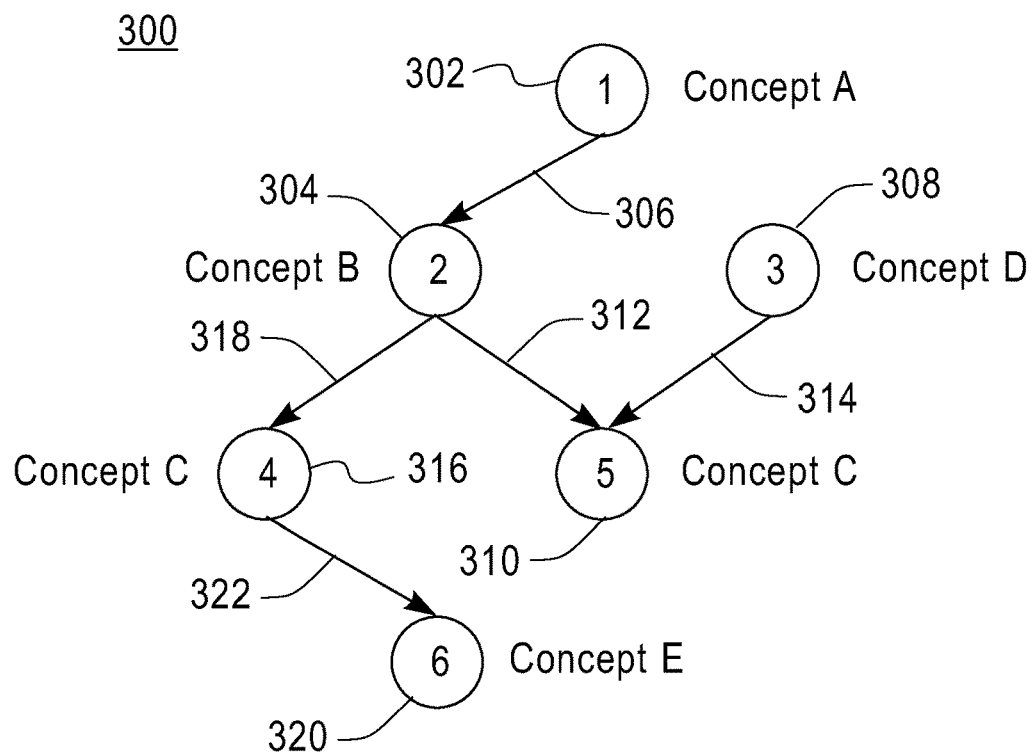
FIG. 3 depicts an example of an ontology graph in accordance with exemplary embodiments.

FIG. 3 depicts a simplified graphical example of ontology 208 as ontology graph 300. Node one 302 points to node two 304 via edge 306. Node two 304 and node three 308 are both parents of node five 310 as indicated by edges 312 and 314 respectively. Node two 304 also points to node four 316 via edge 318. Node four 316 points to node six 320 via edge 322. In the example of ontology graph 300 depicted in FIG. 3, node one 302 holds concept A; node two 304 holds concept B; node three 308 holds concept D; nodes four 316 and five 310 both hold concept C; and, node six 320 holds concept E. The edges 306, 310, 312, 318, and 322 can be labeled or labels can be included in each of the nodes. The SQBE logic 202 of FIG. 2 can analyze the structure of the ontology graph 300 to extract features as summarized in Table 1.

TABLE 1

Extracted Features

| | Concepts | | | | |
|---|---|---|---|---|---|
| | A | B | C | D | E |
| Node 1 | 0 | 1 | 2 | 3 | 3 |
| Node 2 | 1 | 0 | 1 | 2 | 2 |
| Node 3 | 3 | 2 | 1 | 0 | 4 |
| Node 4 | 2 | 1 | 0 | 3 | 1 |
| Node 5 | 2 | 1 | 0 | 1 | 3 |
| Node 6 | 3 | 2 | 1 | 4 | 0 |

In Table 1, each row represents a node, and each column represents a concept in the ontology graph 300. The element cells in Table 1 indicate the shortest distance between each node and concept. The size of the dataset captured in Table 1 is n·k, where n is the total number of nodes and k is the total number of concepts. For most ontologies, k is much less than n, and thus the size of the table is less than n-squared.

The feature extraction performed by the SQBE logic 202 effectively captures the local structures of a node in the ontology 208 via distance information as illustrated in Table 1. The distance information indicates how close a given node is to different concepts. Furthermore, hierarchical information can be inferred from the extracted features, because the distribution of different concepts in the ontology 208 is not uniformly random. In most cases, the concepts alone include rich hierarchical information. Typically, nodes that belong to the same concept cluster together, or appear on the same hierarchical level in the ontology 208. Thus, from feature distributions of the nodes, hierarchical positions can be inferred.

As an example, assume a user wants to find nodes that are parents of any concept C nodes in the ontology graph 300 of FIG. 3. Instead of expressing the query explicitly, the user provides examples 204 to establish the training data 212, where nodes two and three are positive (satisfying the query), and the rest are negative. An example of the training data 212 for the query is provided in Table 2.

TABLE 2

Training Data for example query

| | Concepts | | | | | |
|---|---|---|---|---|---|---|
| | A | B | C | D | E | Label |
| Node 1 | 0 | 1 | 2 | 3 | 3 | −1 |
| Node 2 | 1 | 0 | 1 | 2 | 2 | +1 |
| Node 3 | 3 | 2 | 1 | 0 | 4 | +1 |
| Node 4 | 2 | 1 | 0 | 3 | 1 | −1 |
| Node 5 | 2 | 1 | 0 | 1 | 3 | −1 |
| Node 6 | 3 | 2 | 1 | 4 | 0 | −1 |

Figure 4:
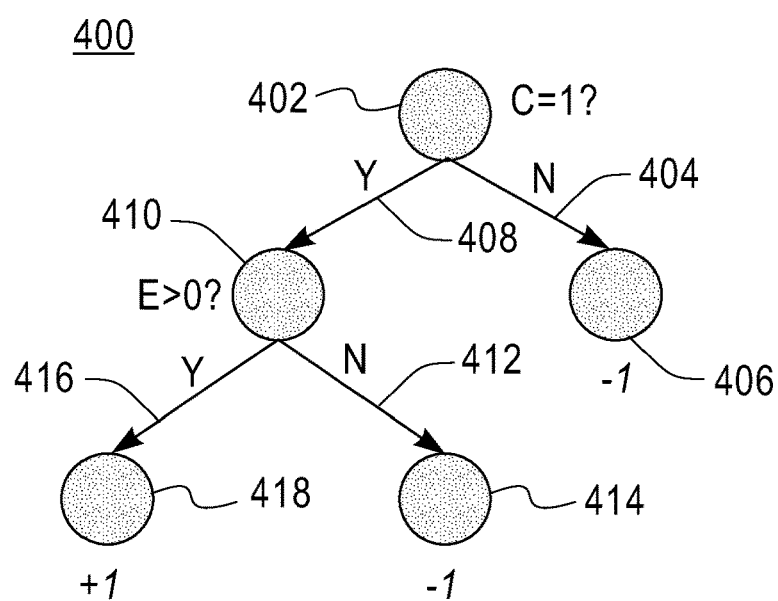
FIG. 4 depicts an example of a decision tree as a graphical depiction of a classifier in accordance with exemplary embodiments.

The SQBE logic 202 of FIG. 2 can learn from the training data 212 to generate or train the classifier 214. An example of a decision tree 400 as a graphical depiction of classifier 214 is shown in FIG. 4. Given a node to classify, decision node 402 first tests if the shortest distance from the node to concept C is 1. If the answer is "no", decision edge 404 directs the decision flow to decision node 406, indicating a "−1" or negative result. Nodes that satisfy the test are either parent or child nodes of concept C node, while other nodes are classified as negative immediately. Upon satisfying the test, decision edge 408 directs the decision flow to decision node 410, where a second test is performed. To exclude child nodes of concept C node, the second test at decision node 410 checks the shortest distance to concept E node. Because the distribution of concepts is not uniformly random, it is presumed that child nodes of concept C nodes are closer to concept E node than parent nodes. If the second test is negative (E is not greater than 0), then decision edge 412 directs the decision flow to decision node 414, indicating a "−1" or negative result. Otherwise, decision edge 416 directs the decision flow to decision node 418, indicating a "+1" or positive result.

It is possible that populating the training data 212 only with examples 204 that are user-provided may not fully characterize a query. For example, if the last record in Table 2 is not included in the training data 212, then the classifier 214 will over generalize the query and classify both child and parent nodes of concept C nodes as positive. To ensure that the classifier 214 eventually has high accuracy, active learning can be employed using active learning logic 218. The active learning logic 218 can select records of tuples 222 that are deemed important to characterizing the query as the optimized examples 220. The user may be prompted to label the optimized examples 220 in the learning process as satisfying or not satisfying the query, with the results used to update the training data 212.

The learning process begins by developing the classifying feature vectors 210, which may be performed during the offline phase for efficient use of processing resources. Alternatively, feature vector computations can be performed as the tuples 222 are inserted or modified in database table 206. While FIG. 2 only depicts a single database table 206, it will be understood that the single database table 206 may be an aggregation of multiple underlying database tables. The SQBE logic 202 examines a collection of tuples 222 of database table 206 and the ontology 208 to perform approximate feature extraction. Each of the tuples 222 can include multiple records associated with concepts of the ontology 208; hence, a single tuple of the tuples 222 may be associated with multiple concept nodes in the ontology 208. For example, a selected tuple with three records could include an identifier plus concept A and concept D of nodes one 302 and three 308 of FIG. 3. Each feature vector for a given tuple may be the union of all the features associated with each concept node in the ontology 208. Alternatively, configurable parameters 224 can be used to limit the size of the feature vectors to a maximum value.

To find the shortest distance between any node and any concept, one approach is to invoke an all pairs shortest distance algorithm. An example of such an algorithm that may be implemented in the SQBE logic 202 is the Floyd-Warshall algorithm, which compares all possible paths through a graph between each pair of vertices. For a graph with V vertices, all possible paths can be compared with $V^3$ comparisons. For small ontologies, the cubic running time is acceptable; however, for large ontologies such as the National Cancer Institute Thesaurus that has about 64,000 concept nodes, computing the shortest path for all pairs may take a prohibitively large amount of time.

In an exemplary embodiment, a depth-first search based algorithm is implemented in the SQBE logic 202 to compute approximate feature vectors for the classifying feature vectors 210. The approximation is based on an assumption that the features most relevant to a given node are usually the nodes that are relatively nearby. Hence, finding the approximate feature vector for a given node C traverses the ontology 208 starting from C for a maximum number of steps and maintains the shortest distance for the nodes traversed. Computing approximate feature vectors can be performed recursively to traverse the ontology 208 and locate concept nodes as well as non-concept nodes. Using depth-limited traversals to compute approximate feature vectors can be significantly more efficient for large ontologies, because each feature vector uses a depth-limited traversal that covers an asymptotically constant number of nodes and the number of such traversals is at most the size of the database table 206. As long as the size of the database table 206 is significantly smaller than $V^3$, computing approximate feature vectors should be more efficient. In an alternate embodiment, the SQBE logic 202 uses a breadth-first search to compute approximate feature vectors for the classifying feature vectors 210.

In order to train the classifier 214, the training data 212 should include both positive and negative examples. However, it might be counter-intuitive to ask the user to provide negative examples, which do not comply with the desired query in the examples 204. In the case where the examples 204 provided by the user are all positive (e.g., label=+1), the SQBE logic 202 generates some negative examples. To generate negative examples, the SQBE logic 202 may randomly pick a set of tuples 222 and label each as negative (e.g., label=−1). Therefore, the training data 212 can include both the examples 204 selected by the user and negative examples selected by the SQBE logic 202. There is a possibility that some tuples 222 selected by the SQBE logic 202 may satisfy the desired query. But, assuming that the tuples 222 satisfying the desired query account for a small proportion of tuples 222 in the database table 206, the classifier 214 can overcome such noise in the data.

In an exemplary embodiment, the SQBE logic 202 constructs a set of negative examples for training by taking a random sample of the database table 206 and labeling corresponding feature vectors as negative. The SQBE logic 202 constructs the training data 212 as the union of the examples 204 and the negative examples. The SQBE logic 202 creates the classifier 214 from the training set and applies the classifier 214 to the classifying feature vectors 210 associated with the database table 206 to produce the semantic query results 216. In one embodiment, the classifier 214 is actively refined to optimize decision boundaries. The SQBE logic 202 can perform mapping between labels in the semantic query results 216 back to the tuples 222 of the database table 206. The learning and the classification occur in feature vector space; hence, mapping the labels from the classification operation back to the tuples 222 in the database table 206 may be performed.

Figure 5:
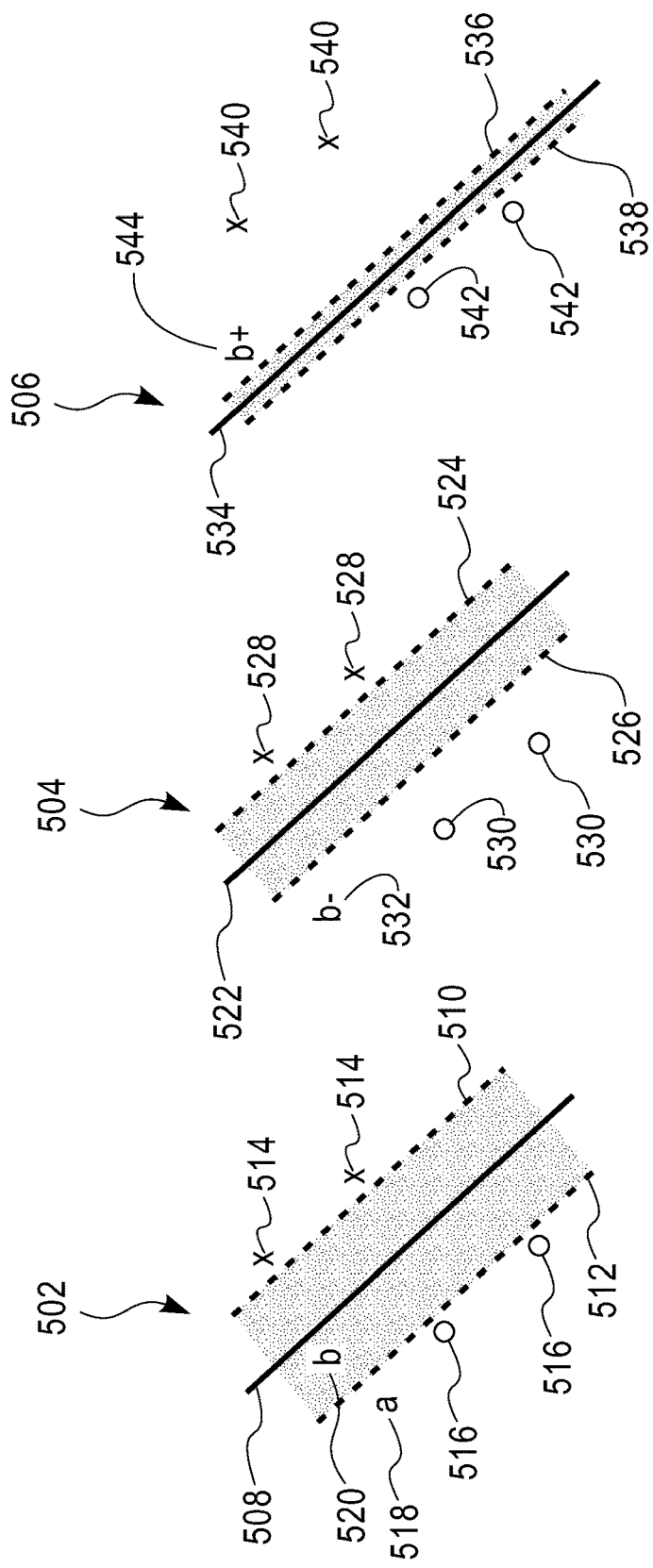
FIG. 5 depicts examples of support vector machine boundaries and margins in accordance with exemplary embodiments.

The SQBE logic 202 may use support vector machines (SVMs) as the base learner in creating the classifier 214. SVMs can also be used to support active learning by the active learning logic 218. SVMs are a class of supervised learning algorithms that learn a linear decision boundary to discriminate between two classes of positive and negative examples in the training data 212. The result is a linear classification rule that can be used to classify new test examples as part of the classifier 214. SVMs learn a decision boundary in a combined feature space of features from the database table 206 and the ontology 208, where the training data 212 holds a selection of the combined features. Decision boundaries are established and refined using SVMs, as a hyper-plane comprising a central decision boundary with a margin positioned between the positive and negative examples in the training data 212. FIG. 5 depicts an example of three SVM models 502, 504, and 506. The SVM model 502 includes a decision boundary 508, positive margin 510, and a negative margin 512, where the positive margin 510 and negative margin 512 are initially assigned as maximum margins between positive examples 514 and negative examples 516. The SVM model 502 can be used to form the classifier 214 of FIG. 2 to select decision points and generate the semantic query results 216.

If the training data 212 of FIG. 2 is relatively small, for instance, 2 to 5 examples, accuracy of the classifier 214 may be reduced. The active learning logic 218 can be used to further refine the classifier 214 and improve accuracy. The active learning logic 218 iteratively selects the best example to incorporate into the training data 212 to improve the quality of the classifier 214. The active learning logic 218 can present the user with optimized examples 220 for the user to label as positive or negative examples in further refining the training data 212. One approach to active learning is to compute SVM models for each possible labeling of a candidate example in order to choose the best example. Such an approach may not be preferred if the number of candidates to consider is large, depending upon the size of the database table 206. A simple heuristic approach to refining the SVM model can be used for a large number of candidates.

An example of the heuristic approach that may be implemented in the active learning logic 218 is depicted in FIG. 5. For SVM model 502, suppose the candidate pool of examples includes of points A 518 and B 520. If point A 518 is presented to the user for labeling, and the user labels point A 518 as negative, then the SVM model 502 and the negative margin 512 do not change, because the current support vectors are still valid. Therefore, the active learning logic 218 selects point B 520 as one of the optimized examples 220 of FIG. 2, since point B 520 is closer to the decision boundary 508 and between the negative margin 512 and the decision boundary 508. Thus, if the user labels point B 520 as negative, then the negative margin 512 will be shifted closer to the decision boundary 508, further refining the SVM model 502.

SVM models 504 and 506 depict examples of further refined models relative to the SVM model 502 based upon additional user identification of optimized examples as positive or negative. For example, SVM model 504 includes a decision boundary 522, positive margin 524, and a negative margin 526, where the positive margin 524 and negative margin 526 are initially assigned as maximum margins between positive examples 528 and negative examples 530. The SVM model 504 reflects a shift in the negative margin 526 after the user selects point B 532 as negative. Similarly, the SVM model 506 includes a decision boundary 534, positive margin 536, and a negative margin 538, where the positive margin 536 and negative margin 538 are initially assigned as maximum margins between positive examples 540 and negative examples 542. The SVM model 506 reflects a shift in the positive margin 536 after the user selects point B 544 as positive.

The active learning logic 218 of FIG. 2 can iteratively pick the example that is closest to a decision boundary, which ensures that the margins of the SVM model get shrunk by nearly half whether the example is labeled positive or negative. The active learning logic 218 computes the distance of each example in the candidate pool to the decision boundary. The distance between any given point x and the decision boundary of an SVM model specified by unit vector w and scalar b is given by, $d(x)=|w \cdot x - b|$. In an exemplary embodiment, the active learning logic 218 selects the optimal example from a set of the tuples 222 from the database table 206 to present to the user for feedback as part of the optimized examples 220. The active learning logic 218 can analyze the training data 212, the tuples 222 from the database table 206, and the SVM model obtained from the last iteration to determine the best example to present to the user. The active learning logic 218 finds a set of unlabeled examples and iterates over the set of unlabeled examples, computing their respective distances to the decision boundary of the current SVM model. The active learning logic 218 returns the example that is closest to the decision boundary as the best example for the iteration. The active learning logic 218 may also use quantization on the set of unlabeled examples to reduce the number of distance computations.

After the best example is selected by the active learning logic 218, it can be stored in the optimized examples 220 and presented to the user for labeling and inclusion in the training data 212 as a labeled example. The active learning logic 218 may optionally augment the labeled examples with randomly sampled negative examples. The resultant SVM model can be used to modify the classifier 214 and generate the semantic query results 216. The user may choose to stop if the semantic query results 216 are deemed satisfactory, or request for another iteration of refinement.

Figure 6:
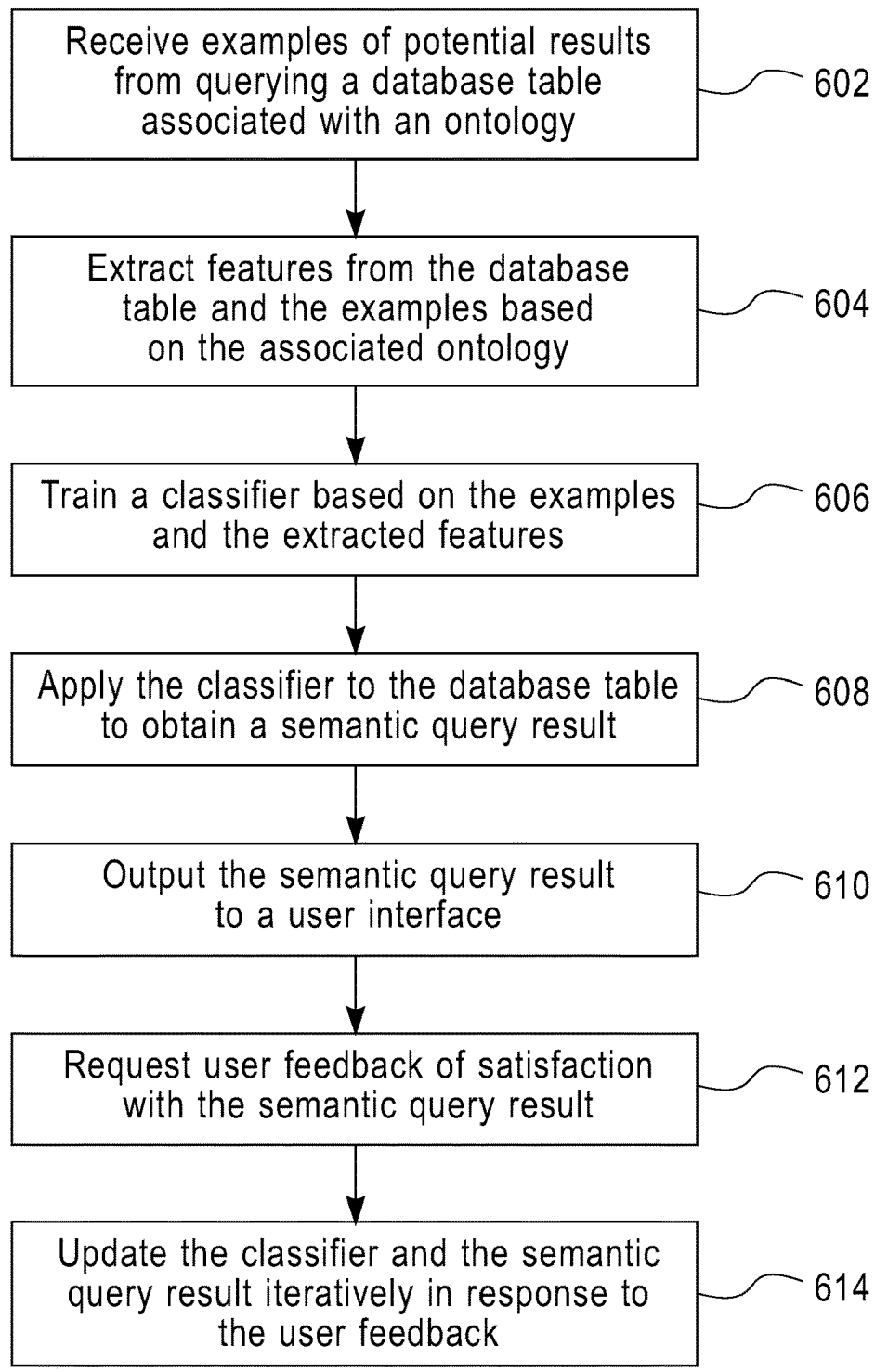
FIG. 6 depicts an exemplary process for producing a semantic query by example in accordance with exemplary embodiments.

Turning now to FIG. 6, a process 600 for producing a semantic query by example will now be described in accordance with exemplary embodiments, and in reference to FIGS. 1-3. At block 602, the SQBE logic 202 receives examples 204 of potential results from querying database table 206, where the database table 206 is associated with ontology 208. Each of the tuples 222 in the database table 206 may be associated with one or more concept nodes in the ontology 208, such as the nodes depicted in FIG. 3, based on mapping between values in records within the tuples 222 and concept names in the ontology 208.

At block 604, the SQBE logic 202 extracts features from the database table 206 and the examples 204 based on the associated ontology 208. The SQBE logic 202 can store the extracted features from the database table 206 as classifying feature vectors 210 defined in a feature space, where the classifying feature vectors 210 define associations between records in tuples 222 of the database table 206 and concepts of the ontology 208. Unique concepts in the ontology 208 can be modeled as dimensions in the feature space, where the value of each dimension is the shortest distance between a selected record associated with one of the unique concepts and other nodes in the ontology 208 representing other unique concepts. The number of dimensions may be limited to a maximum value. The SQBE logic 202 finds concept nodes associated with the selected record by matching concept node labels to a value of the selected record. The SQBE logic 202 may use a depth-first search or a breadth-first search to find concept nodes in a neighborhood. The neighborhood may be limited to the maximum value of the number of dimensions or to a maximum neighborhood size, which can be configured using the configuration parameters 224. The SQBE logic 202 can construct the classifying feature vectors 210 as a union of neighborhood concept nodes and associated distances.

The SQBE logic 202 creates the training data 212 in the feature space from the examples 204. The classifying feature vectors 210 can be stored during an off-line phase prior to receiving the examples 204, while the training data 212 may be created in an on-line phase in response to receiving the examples 204. The SQBE logic 202 can generate negative examples as samples randomly selected from the database table 206. The negative examples may be stored in the training data 212 to assist in establishing boundaries for the classifier 214.

At block 606, the SQBE logic 202 trains the classifier 214 based on the examples 204 and the extracted features. The SQBE logic 202 may use machine learning logic to train the classifier 214 in the feature space using the classifying feature vectors 210 and the training data 212. At block 608, the SQBE logic 202 applies the classifier 214 to the database table 206 to obtain semantic query results 216. The classifier 214 may be applied using the classifying feature vectors 210 to map from the feature space to the database table 206.

At block 610, the SQBE logic 202 outputs the semantic query results 216 to a user interface, such as the monitor 124 of FIG. 1. At block 612, the SQBE logic 202 requests user feedback of satisfaction with the semantic query results 216. Additional examples can be selected from the database table 206 as optimized examples 220 using the active learning logic 218. The additional examples are output to the user interface and additional user feedback is requested based on the additional examples as part of the user feedback. The active learning logic 218 may use support vector machines to select the additional examples by refining margins around decision boundaries to improve the accuracy of the classifier 214. At block 614, the SQBE logic 202 updates the classifier 214 and the semantic query results 216 iteratively in response to the user feedback.

Figure 7:
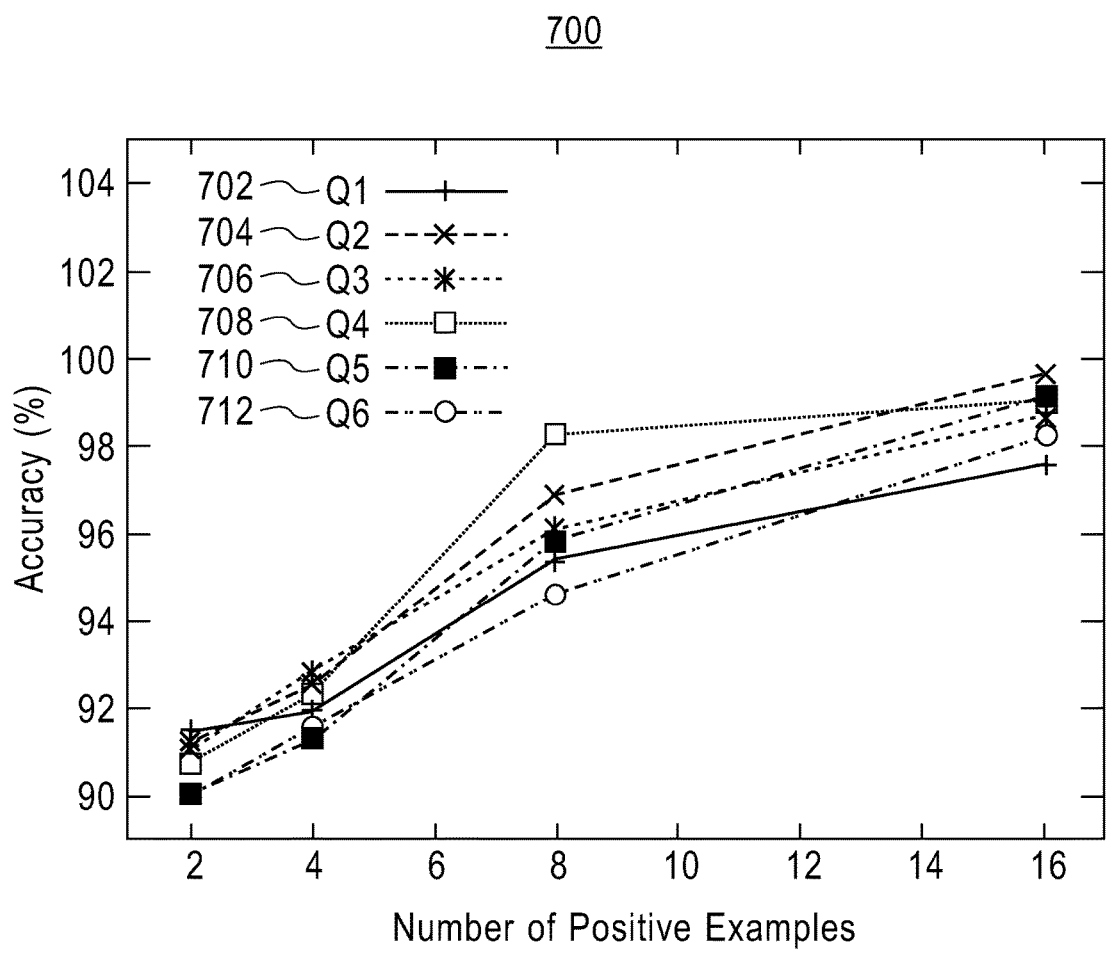
FIG. 7 depicts example results of applying semantic query by example logic as a function of positive examples provided.

FIG. 7 illustrates example results 700 of applying SQBE logic 202 of FIG. 2 as a function of positive examples provided using experimental data. In the example of FIG. 7, the size of the database table 206 is fixed at 10,000, query selectivity is 10%, and the size of the training data 212 is limited to a maximum of 40 examples. A small number of positive examples is used, as it is impractical to expect a human user to supply hundreds of examples. The National Cancer Institute Thesaurus is used as the ontology 208, and the tuples 222 in the database table 206 is generated using values from the National Cancer Institute Thesaurus. A variety of queries Q1 702, Q2 704, Q3 706, Q4 708, Q5 710, and Q6 712 representing various anatomic sites were selected for the experiments. Varying the anatomic sites means that each query Q1 702-Q6 712 is associated with a different subgraph in the ontology 208, including a different number of concept nodes, concept edges, and concept properties. As can be seen in FIG. 7, even with two positive examples in the examples 204, the semantic query system 200 is able to achieve 90% accuracy. Here, accuracy indicates the percentage of tuples 222 in the database table 206 classified correctly by the classifier 214. The example results 700 show that accuracy generally improves with more positive examples included in the example 204.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized, such as any of type of memory depicted in FIG. 1 to store instructions for execution of the SQBE logic 202 and/or the active learning logic 218 of FIG. 2. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include a semantic query system that learns query processing directly without first learning the query structure. The resulting semantic query is defined not only on base attributes in a database table, but also on the semantics of the base data encoded in the associated ontology and the connections between the relational data and the ontology data. Instead of expressing a query explicitly in SQL or any other query language, a user can provide a few examples to characterize the query. The system can determine the query semantics based on machine learning techniques.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A computer-implemented method for producing a semantic query by example, comprising:
   receiving a database table and an ontology associated with the database table;
   receiving, from a user, examples of positive query results for an undefined database query, wherein the examples of positive query results are a user-generated list of examples of known related words;
   extracting features from the database table and the examples of positive query results based on the associated ontology, wherein the extracted features of the database table define associations between records in tuples of the database table and concepts of the associated ontology;
   training a classifier based at least in part on training data, the training data comprising the examples received from the user, the extracted features, and a negative example that is a randomly selected tuple of the database table that is not included in the examples received from the user;
   refining an accuracy of the classifier by executing active learning logic to:
      generate a support vector machine for a candidate pool of examples, wherein the support vector machine comprises a decision boundary and a negative margin;
      present a first candidate example outside the negative margin to a user for labeling;
      receive an indication that the first candidate example has been labeled as negative by the user;
      present a second candidate example to the user for labeling, wherein the second candidate example is closer to the decision boundary than the first candidate example and within the negative margin;
      receive an indication that the second candidate example has been labeled negative by the user;
      in response to the user having labeled the second candidate example as negative and the second candidate example being closer to the decision boundary than the first candidate example, shift the negative margin closer to the decision boundary;
      select the second candidate example as an optimized example; and
      include the optimized example in the training data;
   applying the classifier to the database table to obtain a semantic query result; and
   outputting the semantic query result to a user interface.

2. The method of claim 1 further comprising:
storing the extracted features from the database table as classifying feature vectors defined in a feature space; and
creating training data in the feature space from the examples, wherein the training of the classifier is performed by machine learning in the feature space using the classifying feature vectors and the training data.

3. The method of claim 2 wherein the classifying feature vectors are stored during an off-line phase prior to receiving the examples, and the training data are created in an on-line phase in response to receiving the examples.

4. The method of claim 2 further comprising:
generating negative examples as samples selected from the database table; and
incorporating the negative examples into the training data.

5. The method of claim 2 wherein each tuple in the database table is associated with one or more concept nodes in the ontology based on mapping between values in the records and concept names in the ontology.

6. The method of claim 2 wherein unique concepts in the ontology are dimensions in the feature space, the value of each dimension is the shortest distance between a selected record associated with one of the unique concepts and other nodes in the ontology representing other unique concepts, and the number of dimensions is limited to a maximum value.

7. The method of claim 6 further comprising:
finding concept nodes associated with the selected record by matching concept node labels to a value of the selected record;
using one of a depth-first search and a breadth-first search to find concept nodes in a neighborhood, wherein the search is limited to the maximum value; and
constructing the classifying feature vectors as a union of neighborhood concept nodes and associated distances.

8. A system for producing a semantic query by example, comprising:
semantic query by example logic configured to execute on a processing unit and output to a user interface, wherein the semantic query by example logic is configured to perform a method comprising:
receiving a database table and an ontology associated with the database table;
receiving, from a user, examples of positive query results for an undefined database query, wherein the examples of positive query results are a user-generated list of examples of known related words;
extracting features from the database table and the examples of positive query results based on the associated ontology, wherein the extracted features of the database table define associations between records in tuples of the database table and concepts of the associated ontology;
training a classifier based at least in part on the examples received from the user, the extracted features, and a negative example that is a randomly selected tuple of the database table that is not included in the examples received from the user;
refining an accuracy of the classifier by executing active learning logic to:
generate a support vector machine for a candidate pool of examples, wherein the support vector machine comprises a decision boundary and a negative margin;
present a first candidate example outside the negative margin to a user for labeling;
receive an indication that the first candidate example has been labeled as negative by the user;
present a second candidate example to the user for labeling, wherein the second candidate example is closer to the decision boundary than the first candidate example and within the negative margin;
receive an indication that the second candidate example has been labeled negative by the user;
in response to the user having labeled the second candidate example as negative and the second candidate example being closer to the decision boundary than the first candidate example, shift the negative margin closer to the decision boundary;
select the second candidate example as an optimized example; and
include the optimized example in the training data;
applying the classifier to the database table to obtain a semantic query result; and
outputting the semantic query result to the user interface.

9. The system of claim 8 wherein the semantic query by example logic is further configured to perform:
storing the extracted features from the database table as classifying feature vectors defined in a feature space; and
creating training data in the feature space from the examples, wherein the training of the classifier is performed by machine learning in the feature space using the classifying feature vectors and the training data.

10. The system of claim 9 wherein the classifying feature vectors are stored during an off-line phase prior to receiving the examples, and the training data are created in an on-line phase in response to receiving the examples.

11. The system of claim 9 wherein unique concepts in the ontology are dimensions in the feature space, the value of each dimension is the shortest distance between a selected record associated with one of the unique concepts and other nodes in the ontology representing other unique concepts, and the number of dimensions is limited to a maximum value.

12. The system of claim 11 wherein the semantic query by example logic is further configured to perform:
finding concept nodes associated with the selected record by matching concept node labels to a value of the selected record;
using one of a depth-first search and a breadth-first search to find concept nodes in a neighborhood, wherein the search is limited to the maximum value; and
constructing the classifying feature vectors as a union of neighborhood concept nodes and associated distances.

13. A non-transitory storage medium including a computer program product for producing a semantic query by example, the computer program product comprising:
the non-transitory storage medium readable by a processing circuit and storing instructions for execution by the processing circuit for implementing a method, the method comprising:
receiving a database table and an ontology associated with the database table;

receiving, from a user, examples of positive query results for an undefined database query;

extracting features from the database table and the examples based on the associated ontology, wherein the extracted features of the database table define associations between records in tuples of the database table and concepts of the associated ontology;

training a classifier based at least in part on the examples received from the user, the extracted features, and a negative example that is a randomly selected tuple of the database table that is not included in the examples received from the user;

refining an accuracy of the classifier by executing active learning logic to:
 generate a support vector machine for a candidate pool of examples, wherein the support vector machine comprises a decision boundary and a negative margin;
 present a first candidate example outside the negative margin to a user for labeling;
 receive an indication that the first candidate example has been labeled as negative by the user;
 present a second candidate example to the user for labeling, wherein the second candidate example is closer to the decision boundary than the first candidate example and within the negative margin;
 receive an indication that the second candidate example has been labeled negative by the user;
 in response to the user having labeled the second candidate example as negative and the second candidate example being closer to the decision boundary than the first candidate example, shift the negative margin closer to the decision boundary;
 select the second candidate example as an optimized example; and
 include the optimized example in the training data;

applying the classifier to the database table to obtain a semantic query result; and outputting the semantic query result to a user interface.

14. The computer program product of claim 13 wherein the method further comprises:
 storing the extracted features from the database table as classifying feature vectors defined in a feature space; and
 creating training data in the feature space from the examples, wherein the training of the classifier is performed by machine learning in the feature space using the classifying feature vectors and the training data.

15. The computer program product of claim 14 wherein the classifying feature vectors are stored during an off-line phase prior to receiving the examples, and the training data are created in an on-line phase in response to receiving the examples.

16. The computer program product of claim 14 wherein the method further comprises:
 generating negative examples as samples selected from the database table; and
 incorporating the negative examples into the training data.

17. The computer program product of claim 14 wherein each tuple in the database table is associated with one or more concept nodes in the ontology based on mapping between values in the records and concept names in the ontology.

18. The computer program product of claim 14 wherein unique concepts in the ontology are dimensions in the feature space, the value of each dimension is the shortest distance between a selected record associated with one of the unique concepts and other nodes in the ontology representing other unique concepts, and the number of dimensions is limited to a maximum value.

19. The computer program product of claim 18 wherein the method further comprises:
 finding concept nodes associated with the selected record by matching concept node labels to a value of the selected record;
 using one of a depth-first search and a breadth-first search to find concept nodes in a neighborhood, wherein the search is limited to the maximum value; and
 constructing the classifying feature vectors as a union of neighborhood concept nodes and associated distances.

* * * * *